(12) United States Patent
Taveira et al.

(10) Patent No.: US 10,717,435 B2
(45) Date of Patent: Jul. 21, 2020

(54) ADJUSTABLE OBJECT AVOIDANCE PROXIMITY THRESHOLD BASED ON CLASSIFICATION OF DETECTED OBJECTS

(71) Applicant: QUALCOMM Incorporated, San Diego, CA (US)

(72) Inventors: Michael Franco Taveira, Rancho Santa Fe, CA (US); Daniel Warren Mellinger, III, Philadelphia, PA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/860,838

(22) Filed: Jan. 3, 2018

(65) Prior Publication Data

US 2019/0202449 A1     Jul. 4, 2019

(51) Int. Cl.
| | | |
|---|---|---|
| *B60W 30/09* | (2012.01) | |
| *B64C 39/02* | (2006.01) | |
| *G06K 9/00* | (2006.01) | |
| *G06K 9/62* | (2006.01) | |
| *G08G 5/00* | (2006.01) | |
| *G05D 1/02* | (2020.01) | |
| *G08G 5/04* | (2006.01) | |

(52) U.S. Cl.
CPC .......... *B60W 30/09* (2013.01); *B64C 39/024* (2013.01); *G05D 1/0202* (2013.01); *G06K 9/00671* (2013.01); *G06K 9/00805* (2013.01); *G06K 9/6267* (2013.01); *G08G 5/0013* (2013.01); *G08G 5/0039* (2013.01); *G08G 5/0069* (2013.01); *G08G 5/045* (2013.01); *B60W 2554/00* (2020.02); *B64C 2201/024* (2013.01); *B64C 2201/042* (2013.01); *B64C 2201/127* (2013.01); *B64C 2201/141* (2013.01); *B64C 2201/146* (2013.01)

(58) Field of Classification Search
CPC . B60W 30/09; B64C 39/024; G06K 9/00671; G06K 9/00805; G06K 9/6267
See application file for complete search history.

(56) References Cited

U.S. PATENT DOCUMENTS

| | | |
|---|---|---|
| 4,809,178 A | 2/1989 | Ninomiya et al. |
| 5,979,824 A | 11/1999 | Gagliano et al. |
| 6,253,128 B1 | 6/2001 | Kageyama et al. |

(Continued)

FOREIGN PATENT DOCUMENTS

| | | |
|---|---|---|
| CN | 204776022 U | 11/2015 |
| CN | 106347656 A | 1/2017 |

(Continued)

OTHER PUBLICATIONS

"PhantomPilots", Retrieved from internet on Sep. 27, 2017, https://phantompilots.com/threads/propeller-guards-mounted-obstacle-avoidance-turned-of, pp. 1-9.

(Continued)

*Primary Examiner* — Tyler J Lee
(74) *Attorney, Agent, or Firm* — The Marbury Law Group

(57) ABSTRACT

Various embodiments include methods, devices, and robotic vehicle processing devices implementing such methods for automatically adjusting the minimum distance that a robotic vehicle is permitted to approach an object by a collision avoidance system based upon a classification or type of object.

27 Claims, 7 Drawing Sheets

(56) References Cited

U.S. PATENT DOCUMENTS

| | | |
|---|---|---|
| 6,270,038 B1 | 8/2001 | Cycon et al. |
| 7,335,071 B1 | 2/2008 | Motsenbocker |
| 8,239,125 B2 | 8/2012 | Petrie et al. |
| 8,355,861 B2 | 1/2013 | Petrini |
| 8,543,265 B2 | 9/2013 | Ekhaguere et al. |
| 8,761,967 B2 | 6/2014 | Fisher et al. |
| 9,043,052 B2 | 5/2015 | So et al. |
| 9,261,879 B2 | 2/2016 | Ferguson et al. |
| 9,421,869 B1 | 8/2016 | Ananthanarayanan et al. |
| 9,609,288 B1 | 3/2017 | Richman et al. |
| 9,613,539 B1 * | 4/2017 | Lindskog .................. G08G 5/04 |
| 9,632,507 B1 | 4/2017 | Korn |
| 9,927,807 B1 | 3/2018 | Ganjoo |
| 2003/0051544 A1 | 3/2003 | Hong |
| 2006/0192047 A1 | 8/2006 | Goossen |
| 2007/0034734 A1 | 2/2007 | Yoeli |
| 2007/0080793 A1 | 4/2007 | Blase |
| 2009/0283629 A1 | 11/2009 | Kroetsch et al. |
| 2012/0025962 A1 | 2/2012 | Toll |
| 2012/0025964 A1 | 2/2012 | Beggs et al. |
| 2014/0136044 A1 * | 5/2014 | Conrad .................. B60W 30/09 701/23 |
| 2015/0269847 A1 | 9/2015 | Knight |
| 2015/0321759 A1 | 11/2015 | Caubel et al. |
| 2016/0016664 A1 | 1/2016 | Basuni |
| 2016/0023759 A1 | 1/2016 | Barrett et al. |
| 2016/0039529 A1 | 2/2016 | Buchmueller et al. |
| 2016/0075332 A1 | 3/2016 | Edo-Ros |
| 2016/0185345 A1 | 6/2016 | Sasabuchi et al. |
| 2016/0200437 A1 | 7/2016 | Ryan et al. |
| 2016/0247115 A1 | 8/2016 | Pons |
| 2017/0029101 A1 | 2/2017 | Weissenberg |
| 2017/0043869 A1 | 2/2017 | Howard et al. |
| 2017/0069214 A1 * | 3/2017 | Dupray .................. G08G 5/0021 |
| 2017/0076616 A1 | 3/2017 | Kanade et al. |
| 2017/0090480 A1 | 3/2017 | Ho et al. |
| 2017/0132334 A1 | 5/2017 | Levinson et al. |
| 2017/0144753 A1 | 5/2017 | Yu et al. |
| 2017/0158320 A1 | 6/2017 | Bosch |
| 2017/0177937 A1 | 6/2017 | Harmsen et al. |
| 2017/0235018 A1 | 8/2017 | Foster et al. |
| 2017/0242442 A1 | 8/2017 | Minster |
| 2017/0255206 A1 | 9/2017 | Chen et al. |
| 2017/0267234 A1 | 9/2017 | Kemp et al. |
| 2017/0267347 A1 | 9/2017 | Rinaldi et al. |
| 2017/0301249 A1 | 10/2017 | Kunzi et al. |
| 2017/0313421 A1 | 11/2017 | Gil et al. |
| 2017/0323256 A1 | 11/2017 | Cheatham, III et al. |
| 2017/0339487 A1 | 11/2017 | Alvord et al. |
| 2018/0155018 A1 | 6/2018 | Kovac et al. |
| 2018/0246529 A1 | 8/2018 | Hu et al. |
| 2018/0275654 A1 | 9/2018 | Merz et al. |
| 2018/0290748 A1 | 10/2018 | Corban et al. |
| 2018/0297695 A1 | 10/2018 | Ramirez-Serrano |
| 2019/0205609 A1 | 7/2019 | Taveira et al. |
| 2019/0206266 A1 | 7/2019 | Taveira et al. |
| 2019/0206267 A1 | 7/2019 | Taveira et al. |
| 2019/0206268 A1 | 7/2019 | Taveira et al. |
| 2019/0225327 A1 | 7/2019 | Kidakarn |

FOREIGN PATENT DOCUMENTS

| | | |
|---|---|---|
| DE | 202013006196 U1 | 10/2014 |
| GB | 2483881 A | 3/2012 |
| KR | 20100027683 A | 3/2010 |
| WO | 2010135727 A1 | 11/2010 |
| WO | 2014027945 A1 | 2/2014 |
| WO | 2016053194 A1 | 4/2016 |
| WO | 2017043694 A1 | 3/2017 |
| WO | 2017086234 A1 | 5/2017 |
| WO | 2017168423 A1 | 10/2017 |
| WO | 2018032924 A1 | 2/2018 |

OTHER PUBLICATIONS

Dji et al., "PHANTOM 4: Prop Guards Installation Guide", Apr. 20, 2016 (Apr. 20, 2016), XP055546279, 5 Pages, Retrieved from the Internet: URL:https://dl.djicdn.com/downloads/phantom_4/en/En_Phantom_4_Prop_Guard_User_Guide_160420.pdf [retrieved on Jan. 23, 2019].

International Search Report and Written Opinion—PCT/US2018/063757—ISA/EPO—dated Mar. 14, 2019, 14 pages.

* cited by examiner

ADJUSTABLE OBJECT AVOIDANCE PROXIMITY THRESHOLD BASED ON CLASSIFICATION OF DETECTED OBJECTS

BACKGROUND

Robotic vehicles, such as aerial robotic vehicles or "drones," are often used for a variety of applications, such as surveillance, photography, and/or cargo delivery. Many robotic vehicles use obstacle avoidance systems that work in conjunction with vehicle control systems to avoid hitting people, property, and objects. For example, once a robotic vehicle detects a nearby object, the obstacle avoidance system executing within the controller may prevent the robotic vehicle from approaching the object closer than some minimum distance (which is referred to herein as a "proximity threshold"). The proximity threshold is typically a fixed distance. In the case of aerial robotic vehicles that includes propeller blades, the proximity threshold may be a few feet to avoid damage and/or injury from contact with the spinning propeller blades.

SUMMARY

Various embodiments include devices, systems, and methods for operating a robotic vehicle with a collision avoidance system configured to avoid objects by a proximity threshold that depends upon a classification of the objects. In various embodiments, methods implemented by a processor of a robotic vehicle may include processing sensor data from one or more sensors to detect an object in a vicinity of the robotic vehicle, determining, based on the sensor data, a classification of the object in the vicinity of the robotic vehicle, adjusting a proximity threshold setting in a collision avoidance system based on the classification of the object in the vicinity of the robotic vehicle, and controlling the robotic vehicle using the adjusted proximity threshold for collision avoidance.

Some embodiments may further include determining whether the object in the vicinity of the robotic vehicle poses an obstacle or potential obstacle to the robotic vehicle. In such embodiments, determining a classification of an object in the vicinity of the robotic vehicle may include determining the classification of the object in response to determining that the object poses an obstacle or potential obstacle to the robotic vehicle, and adjusting the proximity threshold setting in the collision avoidance system based on the classification of the object may include adjusting the proximity threshold setting in the collision avoidance system based on the classification of the object determined to pose an obstacle or potential obstacle to the robotic vehicle.

In some embodiments, adjusting the proximity threshold based on the classification of the object in the vicinity of the robotic vehicle may include changing the proximity threshold from a default proximity threshold to a proximity threshold corresponding to the classification of the object.

In some embodiments, determining the classification of the object in the vicinity of the robotic vehicle may include determining whether the object is animate object or inanimate object, and adjusting the proximity threshold setting in the collision avoidance system based on the classification of the object may include one or both of increasing the proximity threshold in response to the classification of the object being animate or decreasing the proximity threshold in response to the classification of the object being inanimate.

In some embodiments, adjusting the proximity threshold setting in the collision avoidance system based on the classification of the object may include determining the proximity threshold corresponding to the determined classification of the object. In such embodiments, determining the proximity threshold corresponding to the determined classification of the object may include accessing a data structure in memory for the proximity threshold correlated to the classification of the object.

Some embodiments for may further include returning the proximity threshold setting in the collision avoidance system to a default setting in response to determining that there are no objects in the vicinity of the robotic vehicle.

In some embodiments, determining a classification of the object in the vicinity of the robotic vehicle may include determining a classification for all objects posing an obstacle or potential obstacle to the robotic vehicle. In such embodiments, adjusting a proximity threshold setting in the collision avoidance system based on the classification of the object in the vicinity of the robotic vehicle may include generating a map of all objects posing an obstacle or potential obstacle to the robotic vehicle in which a proximity threshold corresponding to each object based on the object's classification may be added as an exclusion perimeter around the object's volume. In such embodiments, controlling the robotic vehicle using the adjusted proximity threshold for collision avoidance may include determining a detour path that remains outside the exclusion perimeter of all detected obstacles, and controlling the robotic vehicle to execute the detour path. In such embodiments, a default proximity threshold maybe used to add an exclusion perimeter around any object for which a classification is not determined.

Further embodiments include a robotic vehicle having a processor configured with processor-executable instructions to perform operations of any of the methods summarized above. Further embodiments include a processing device for use in a robotic vehicle configured to perform operations of any of the methods summarized above. Further embodiments include a non-transitory processor-readable media having stored thereon processor-executable instructions configured to cause a processor of a robotic vehicle to perform operations of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
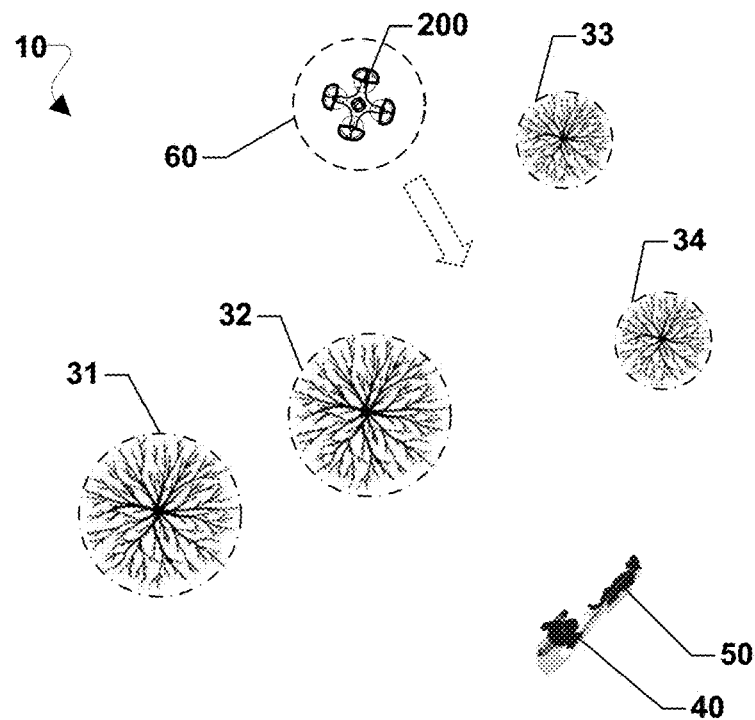
FIGS. 1A and 1B are a plan views of an environment in which a robotic vehicle avoids obstacles by at least a proximity threshold that depends upon a classification of each obstacle in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and robotic vehicle processing devices implementing such methods for automatically adjusting the minimum distance that a robotic vehicle is permitted to approach an object by a collision avoidance system based upon a classification or type of obstacle or object. Adjusting the minimum approach distance or proximity threshold used in a collision avoidance system based on the classification or type of obstacles or objects enables robotic vehicles to operate with greater range than is feasible using a fixed proximity threshold, while remaining a safe distance away from sensitive or valuable objects. In some embodiments, the classification may be whether the object or obstacle is animate or inanimate. In some embodiments, the classification may be whether the object or obstacle is sensitive or valuable objects, such as whether the object or obstacle is classified as a human, an animal, a structure, an automobile, artwork, glassware, etc. The proximity threshold assigned to the object or obstacle may vary depending upon the type or classification of the object or obstacle, such as assigning a larger proximity threshold to children than to adults. A default proximity threshold may be used for objects for which a classification is not determined. In some embodiments, a processor of a robotic vehicle may determine a classification for an object that is being approached, and adjust the proximity threshold used by the collision avoidance system based on that object's classification. In some embodiments, the processor of the robotic vehicle may classify all detected objects, determine an exclusion perimeter for each object based on the classification, and determine a detour path to remain outside the exclusion perimeter of all detected objects.

As used herein, the terms "robotic vehicle" and "drone" refer to one of various types of vehicles including an onboard computing device configured to provide some autonomous or semi-autonomous capabilities. Examples of robotic vehicles include but are not limited to: robotic vehicles, such as an unmanned aerial vehicle (UAV); ground vehicles (e.g., an autonomous or semi-autonomous car, a vacuum robot, etc.); water-based vehicles (i.e., vehicles configured for operation on the surface of the water or under water); space-based vehicles (e.g., a spacecraft or space probe); and/or some combination thereof. In some embodiments, the robotic vehicle may be manned. In other embodiments, the robotic vehicle may be unmanned. In embodiments in which the robotic vehicle is autonomous, the robotic vehicle may include an onboard computing device configured to maneuver and/or navigate the robotic vehicle without remote operating instructions (i.e., autonomously), such as from a human operator (e.g., via a remote computing device). In embodiments in which the robotic vehicle is semi-autonomous, the robotic vehicle may include an onboard computing device configured to receive some information or instructions, such as from a human operator (e.g., via a remote computing device), and autonomously maneuver and/or navigate the robotic vehicle consistent with the received information or instructions. In some implementations, the robotic vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic vehicle. Specific non-limiting examples of rotorcraft include tricopters (three rotors), quadcopters (four rotors), hexacopters (six rotors), and octocopters (eight rotors). However, a rotorcraft may include any number of rotors.

The term "obstacle" is used herein to refer to an object that a robotic vehicle must maneuver around to avoid a collision.

The term "proximity threshold" is used herein to refer to a minimum distance between an object and a robotic vehicle that a collision avoidance system will permit before controlling the robotic vehicle to stop or change a direction of travel away from the object. Similarly, the term "exclusion perimeter" is used herein to refer to a distance around an object that a robotic vehicle should avoid to ensure that the robotic vehicle remains outside the proximity threshold.

Figure 1B:
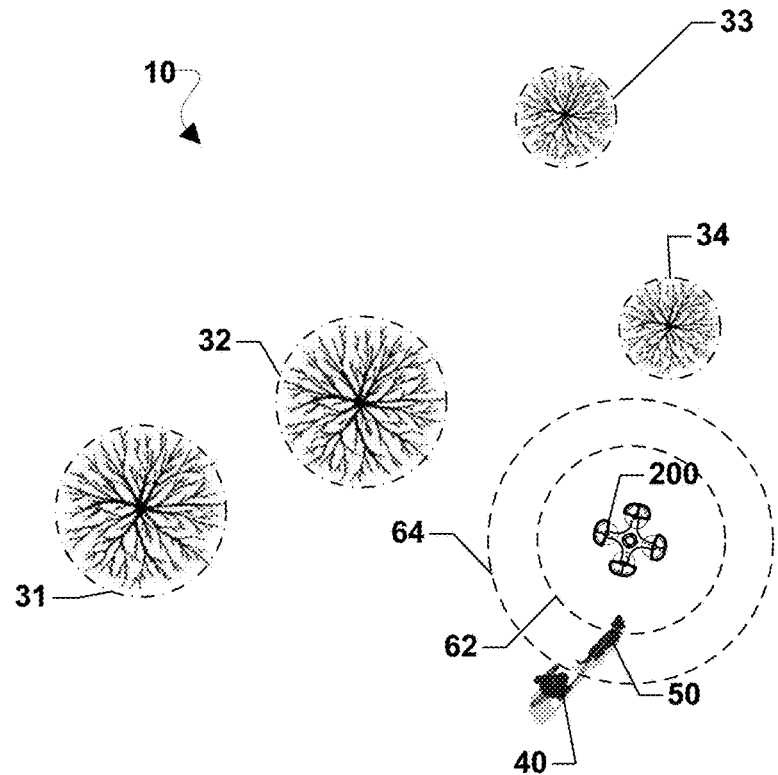

Operations of a robotic vehicle 200 within an environment 10 that includes various trees 31, 32, 33, 34 and a human 40 walking a dog 50 according to various embodiments are illustrated in FIGS. 1A and 1B. Referring to FIG. 1A, when the robotic vehicle 200 approaches objects (e.g., trees 31-34), processor within the robotic vehicle 200 may process data received from onboard sensors (e.g., a camera, radar, lidar, etc.) to determine a type or classification of nearby objects. In the example illustrated in FIG. 1A, the processor of the robotic vehicle 200 may identify the nearby objects 31-34 as trees or non-animate objects. In some embodiments, the processor may determine that nearby objects 31-34 are not classified as sensitive or valuable objects, particularly if the objects do not fit a given or preloaded classification. In the illustrated example in which the nearby objects 31-34 are trees (i.e., not fragile or valuable), the processor may not adjust the proximity threshold 60, and thus the collision avoidance system implemented in the processor may remain at a default value. In some embodiments, the default value of the proximity threshold 60 may depend upon whether the robotic vehicle 200 is or is not equipped with propeller guards. With the proximity threshold 60 set at the default value, the robotic vehicle 200 is able to maneuver or follow user control commands to fly between the detected objects, such as along a path between trees 32, 33 and 34.

Referring to the example illustrated in FIG. 1B, having transited the trees 32-34, the robotic vehicle 200 may approach a person 40 walking a dog 50. Detecting these objects, the processor may process sensor data (e.g., camera image data) and classify the objects as fragile or valuable, and/or as a human and an animal. Based upon this classification, the processor may adjust the proximity threshold 62, 64 used by the collision avoidance system to give the person 40 and dog 50 a wider berth. Further, the proximity threshold 64 used by the collision avoidance system for avoiding the person 40 may be different (e.g., larger) than the proximity threshold 62 used by the collision avoidance system for avoiding the dog of 50 since the consequences in terms of injury and liability of striking a human may be greater than of striking an animal. Thus, various embodiments enable the robotic vehicle collision avoidance system to dynamically adjust how close the robotic vehicle is able to approach various objects while operating in an environment.

Figure 1C:
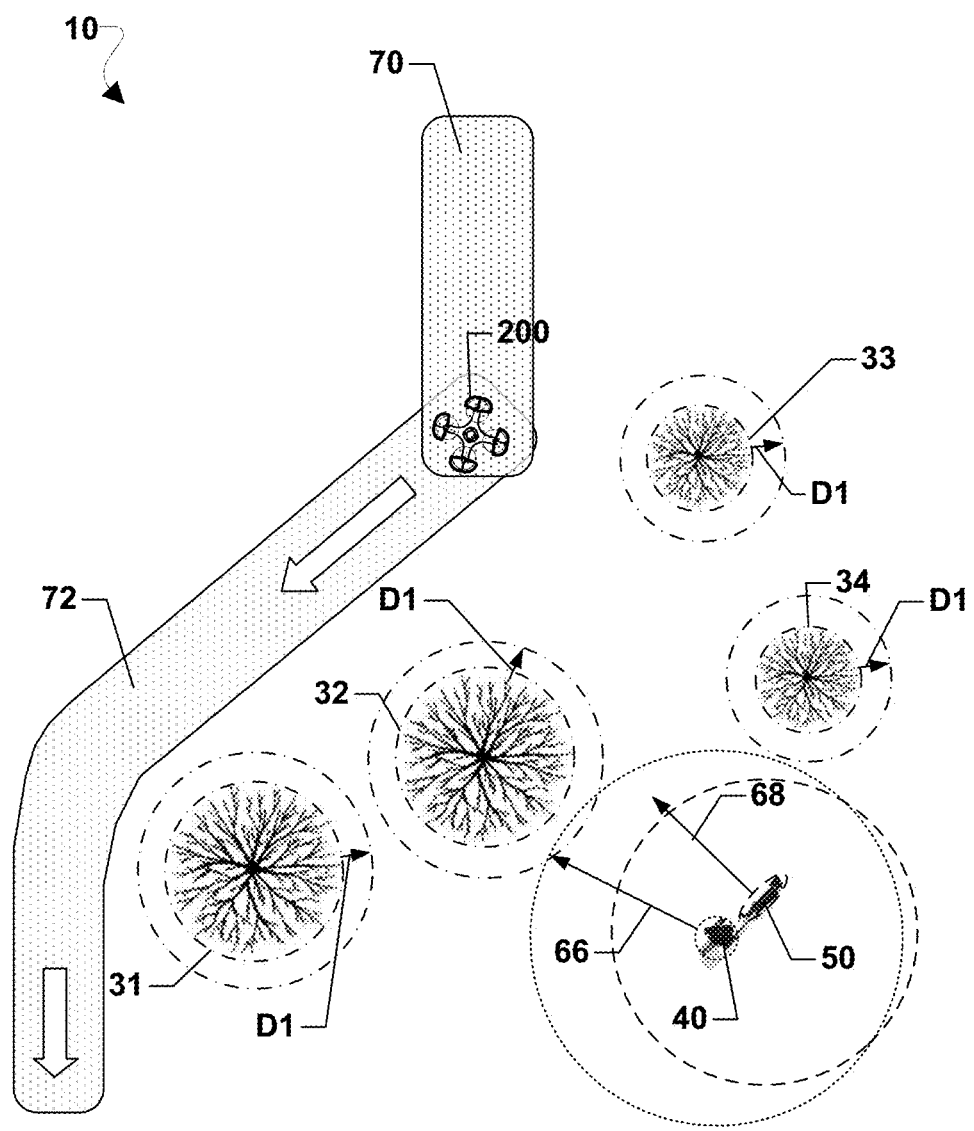
FIG. 1C is a plan view of an environment of FIG. 1A in which the robotic vehicle performs path planning to avoid various obstacles by exclusion perimeter distances corresponding to a determine classification of each obstacle in accordance with various embodiments.

FIG. 1C illustrates a further embodiment in which the proximity threshold for various objects detected by robotic vehicle may be used in planning a path to avoid approaching any object closer than an appropriate proximity threshold. With reference to FIGS. 1A-1C, a robotic vehicle 200 transiting along a path 70 will eventually detect objects in its path that includes trees 31-34, a human 40, and a dog 50. In some embodiments, a processor of the robotic vehicle 200 may evaluate the detected objects, such as through visual processing and image recognition methods, to determine a type or classification of each of the objects 31-34, 40, 50. The processor may then determine an appropriate proximity threshold for each of the observed objects 31-34, 40, 50 that should be implemented in the collision avoidance system. Because the various objects have differing appropriate proximity threshold as described, the processor may take into account all of the determined proximity thresholds in order to plot an alternative path around all detected objects. In order to do so efficiently, the processor may generate an internal map of each of the detected objects that adds an exclusion perimeter around each object based upon the proximity threshold appropriate for that object. For example, internal map of each of the detected objects may include an exclusion perimeter that is of width D1 beyond the perimeter of the trees 31-34, of a radius 66 about the human 40, and of a radius 68 about the dog 50. In the example, illustrated in FIG. 1C, the extent of the exclusion perimeter about the human 40 (i.e., the radius 66) is larger than the exclusion perimeter about the dog 50 (i.e., the radius 68) as the potential for injury (as well as the consequences of an injury) to a human exceeds that of a dog. Similarly, the exclusion perimeter about the trees 31-34 (i.e., the additional radial length D1) is less than the exclusion perimeter about either the human 40 or dog 50 as the consequences of colliding with a tree may be limited to damage caused to the robotic vehicle. Such a map enables the processor to then determine a detour or path 72 around the detected objects that will ensure the robotic vehicle 200 does not approach any of the objects closer than their corresponding proximity threshold.

Figure 2:
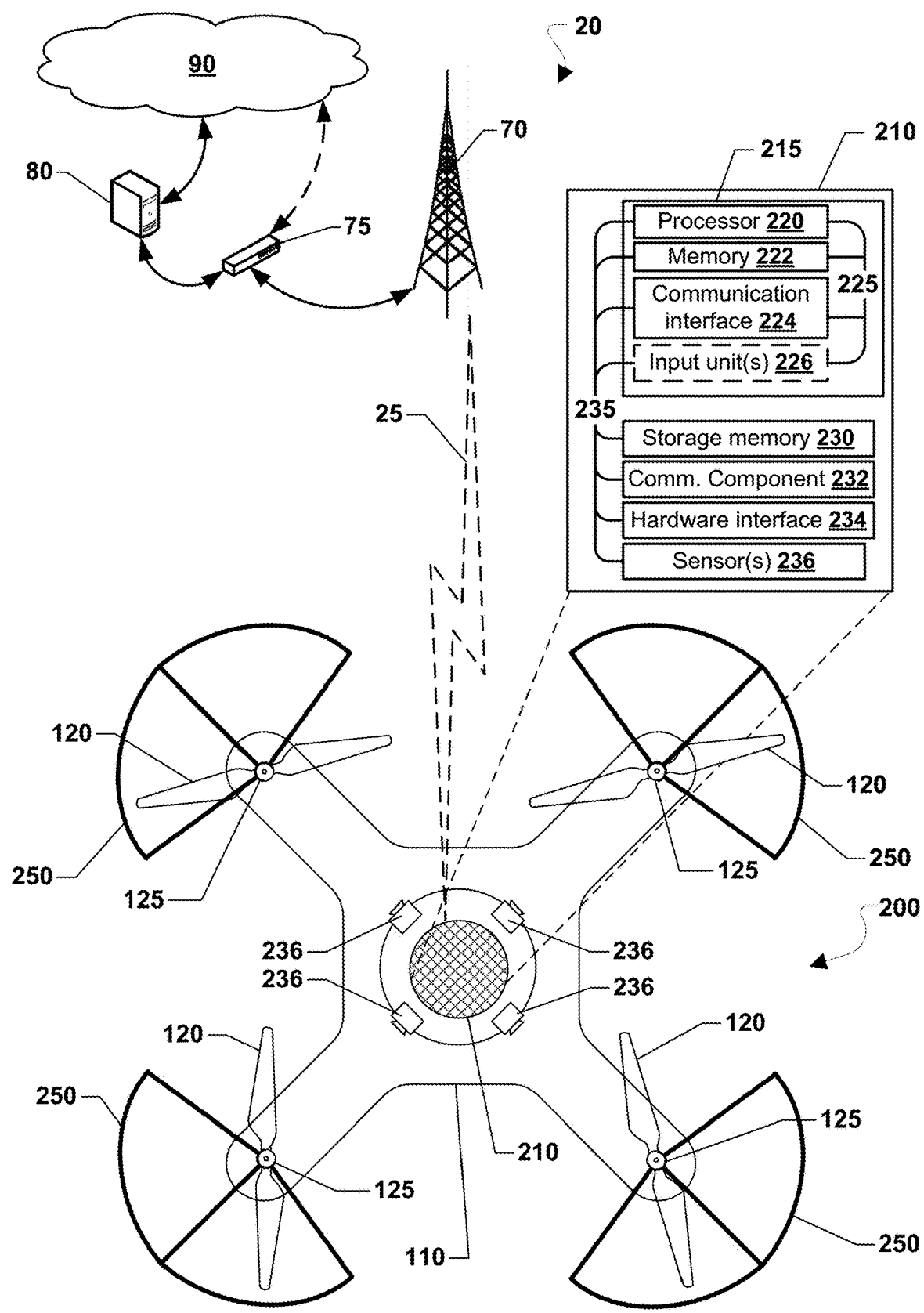
FIG. 2 is a block diagram illustrating components of a robotic vehicle and a ground station suitable for use in various embodiments.

Various embodiments may be implemented within a variety of robotic vehicles configured to communicate with one or more communication networks, an example of which in the form of an aerial robotic vehicle 200 suitable for use with various embodiments is illustrated in FIG. 2. With reference to FIGS. 1A-2, an aerial robotic vehicle 200 operating in a mission environment 20 may include a plurality of rotors 120 (e.g., four rotors), each driven by a corresponding motor 125. A body 110 of the aerial robotic vehicle 200 may support the plurality of rotors 120 and motors 125. In some instances, the robotic vehicle 110 may include propeller guards 250 positioned about the rotors 120 to reduce the damage that a collision may cause to an object, such as a human.

An aerial robotic vehicle 200 may include one or more onboard sensors, such as one or more cameras 236. The aerial robotic vehicle 200 may include a processing device 210, which may further include one or more attitude sensors, such as an altimeter, a gyroscope, accelerometers, an electronic compass, a satellite positioning system receiver, etc., that may be used by the processor 220 to determine vehicle attitude and location information for controlling flight and navigating.

Cameras 236 may be disposed in various locations on the aerial robotic vehicle 200 and different types of camera may be included. For example, a first set of cameras 236 may face a side of each of the rotors 120 in the plane of rotation thereof, such as mounted near a central part of the aerial robotic vehicle 200. Additionally, or alternatively, second set of cameras 236 may be mounted under the rotors 120, such as in a position configured to detect whether propeller guards 250 are present. The aerial robotic vehicle 200 may also include other types of sensors, including detection and ranging sensors, such as radar, sonar, lidar, and the like.

Image data generated by the cameras 236, as well as data from one or more other types of sensors (e.g., radar, sonar, lidar, etc.), may be used by an object avoidance system executing in the processor 220. In various embodiments, image and other sensor data received from cameras 236 may be processed by an object avoidance system to detect objects or obstacles in the vicinity of the robotic vehicle 200 during operation.

The aerial robotic vehicle 200 may include a processing device 210 that may be coupled to each of the plurality of motors 125 that drive the rotors 120. The processing device 210 may be configured to monitor and control the various functionalities, sub-systems, and components of the aerial robotic vehicle 200. For example, the processing device 210 may be configured to monitor and control various modules, software, instructions, circuitry, hardware, etc. related to propulsion, navigation, power management, sensor management, and/or stability management.

The processing device 210 may house various circuits and devices used to control the operation of the aerial robotic vehicle 200. For example, the processing device 210 may include a processor 220 that directs the control of the aerial robotic vehicle 200. The processor 220 may include one or more processors configured to execute processor-executable instructions (e.g., applications, routines, scripts, instruction sets, etc.) to control flight, antenna usage, and other operations of the aerial robotic vehicle 200, including operations of various embodiments. In some embodiments, the processing device 210 may include memory 222 coupled to the processor 220 and configured to store data (e.g., flight plans, obtained sensor data, received messages/inputs, applications, etc.). The processor 220 and memory 222 may be configured as or be included within a system-on-chip (SoC) 215 along with additional elements such as (but not limited to) a communication interface 224, one or more input units 226, non-volatile storage memory 230, and a hardware interface 234 configured for interfacing the SoC 215 with hardware and components of the aerial robotic vehicle 200. Components within the processing device 210 and/or the SoC 215 may be coupled together by various circuits, such as a bus 225, 235 or another similar circuitry.

The processing device 210 may include more than one SoC 215 thereby increasing the number of processors 220 and processor cores. The processing device 210 may also include processors 220 that are not associated with the SoC 215. Individual processors 220 may be multi-core processors. The processors 220 may each be configured for specific purposes that may be the same as or different from other processors 220 of the processing device 210 or SoC 215.

One or more of the processors 220 and processor cores of the same or different configurations may be grouped together. A group of processors 220 or processor cores may be referred to as a multi-processor cluster.

The terms "system-on-chip" or "SoC" are used herein to refer to a set of interconnected electronic circuits typically, but not exclusively, including one or more processors (e.g., 220), a memory (e.g., 222), and a communication interface (e.g., 224). The SoC 215 may include a variety of different types of processors 220 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. An SoC 215 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

In various embodiments, the processing device 210 may include or be coupled to one or more communication components 232, such as a wireless transceiver, an onboard antenna, and/or the like for transmitting and receiving wireless signals through the wireless communication link 25. The one or more communication components 232 may be coupled to the communication interface 224 and may be configured to handle wireless wide area network (WWAN) communication signals (e.g., cellular data networks) and/or wireless local area network (WLAN) communication signals (e.g., Wi-Fi signals, Bluetooth signals, etc.) associated with ground-based transmitters/receivers (e.g., base stations, beacons, Wi-Fi access points, Bluetooth beacons, small cells (picocells, femtocells, etc.), etc.). The one or more communication components 232 may receive data from radio nodes, such as navigation beacons (e.g., very high frequency (VHF) omni-directional range (VOR) beacons), Wi-Fi access points, cellular network base stations, radio stations, etc.

The processing device 210, using the processor 220, the one or more communication components 232, and an antenna may be configured to conduct wireless communications with a variety of remote computing devices, examples of which include the base station or cell tower (e.g., base station 20), a beacon, server, a smartphone, a tablet, or another computing device with which the aerial robotic vehicle 200 may communicate. The processor 220 may establish the wireless communication link 25 via a modem and the antenna. In some embodiments, the one or more communication components 232 may be configured to support multiple connections with different remote computing devices using different radio access technologies. In some embodiments, the one or more communication components 232 and the processor 220 may communicate over a secured communication link. The security communication links may use encryption or another secure means of communication in order to secure the communication between the one or more communication components 232 and the processor 220.

The aerial robotic vehicle 200 may operate in the mission environment 20 communicating with a base station 70, which may provide a communication link to a remote computing device 75 and/or a remote server 80 via a communication network 90. The base station 70 may provide the wireless communication link 25, such as through wireless signals to the aerial robotic vehicle 200. The remote computing device 75 may be configured to control the base station 70, the aerial robotic vehicle 200, and/or control wireless communications over a wide area network, such as providing a wireless access points and/or other similar network access point using the base station 70. In addition, the remote computing device 75 and/or the communication network 90 may provide access to a remote server 80. The aerial robotic vehicle 200 may be configured to communicate with the remote computing device 75 and/or the remote server 80 for exchanging various types of communications and data, including location information, navigational commands, data inquiries, and mission data.

Aerial robotic vehicles may navigate or determine positioning using altimeters or navigation systems, such as Global Navigation Satellite System (GNSS), Global Positioning System (GPS), etc. In some embodiments, the aerial robotic vehicle 200 may use an alternate source of positioning signals (i.e., other than GNSS, GPS, etc.). The aerial robotic vehicle 200 may use position information associated with the source of the alternate signals together with additional information (e.g., dead reckoning in combination with last trusted GNSS/GPS location, dead reckoning in combination with a position of the aerial robotic vehicle takeoff zone, etc.) for positioning and navigation in some applications. Thus, the aerial robotic vehicle 200 may navigate using a combination of navigation techniques, including dead-reckoning, camera-based recognition of the land features below and around the aerial robotic vehicle 200 (e.g., recognizing a road, landmarks, highway signage, etc.), etc. that may be used instead of or in combination with GNSS/GPS location determination and triangulation or trilateration based on known locations of detected wireless access points.

In some embodiments, the processing device 210 of the aerial robotic vehicle 200 may use one or more of various input units 226 for receiving control instructions, data from human operators or automated/pre-programmed controls, and/or for collecting data indicating various conditions relevant to the aerial robotic vehicle 200. For example, the input units 226 may receive input from one or more of various components, such as camera(s) or other imaging sensors, detection and ranging sensors (e.g., radar, sonar, lidar, etc.), microphone(s), position information functionalities (e.g., a global positioning system (GPS) receiver for receiving GPS coordinates), flight instruments (e.g., attitude indicator(s), gyroscope(s), anemometer, accelerometer(s), altimeter(s), compass(es), etc.), keypad(s), etc. The camera(s) may be optimized for daytime and/or nighttime operation.

Aerial robotic vehicles may be winged or rotor craft varieties. For example, the aerial robotic vehicle 200 may be a rotary propulsion design that utilizes one or more rotors 120 driven by corresponding motors to provide lift-off (or take-off) as well as other aerial movements (e.g., forward progression, ascension, descending, lateral movements, tilting, rotating, etc.). The aerial robotic vehicle 200 is illustrated as an example of a robotic vehicle that may utilize various embodiments, but is not intended to imply or require that various embodiments are limited to a quad-rotor aircraft.

Figure 3A:
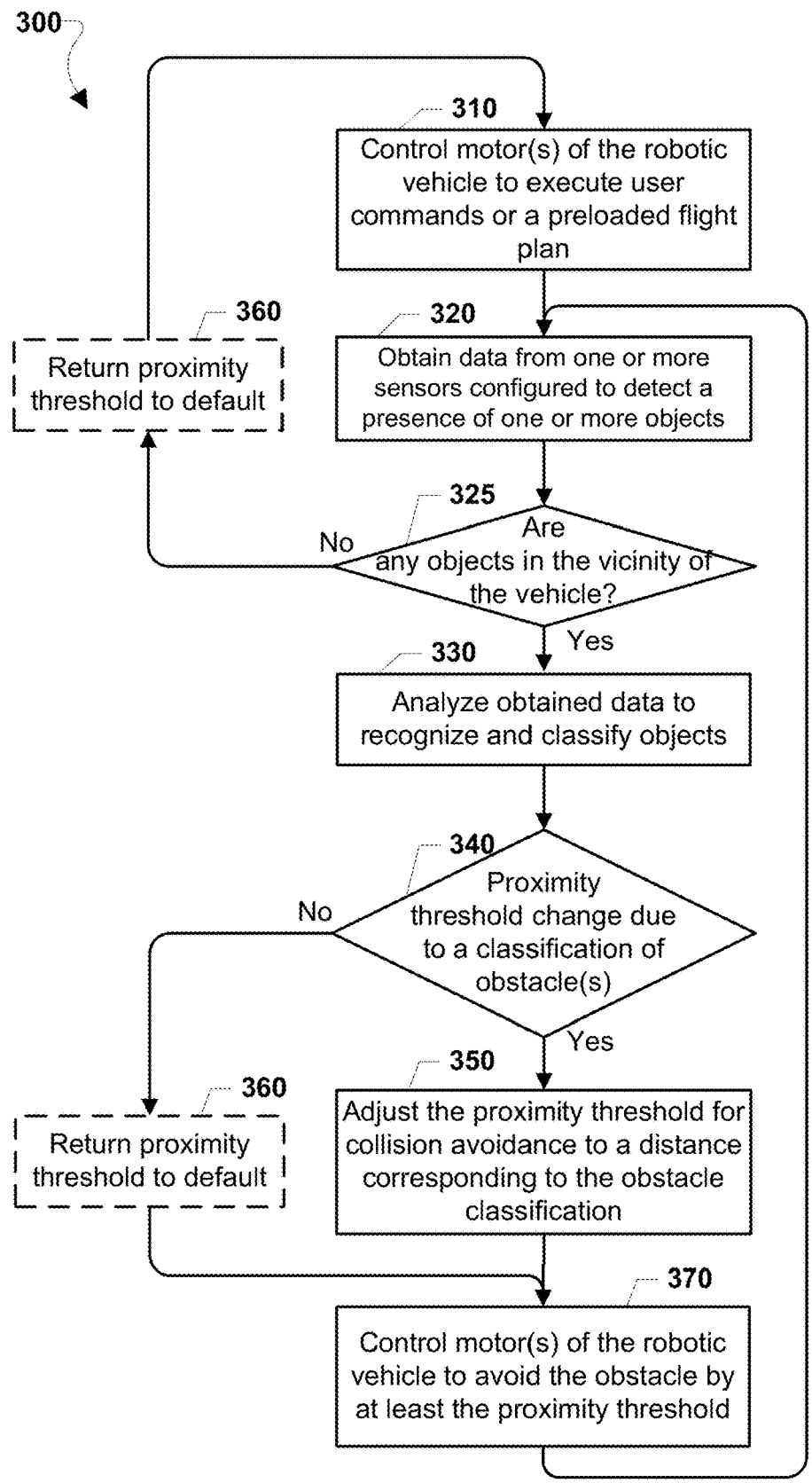
FIG. 3A is a process flow diagram illustrating a method for operating a robotic vehicle to avoid objects by at least a proximity threshold that depends upon a classification of the object in accordance with various embodiments.

FIG. 3A illustrates a method 300 for adjusting the proximity threshold used by a collision avoidance system of a robotic vehicle according to some embodiments. With reference to FIGS. 1A-3A, the method 300 may be performed by a processor, such as a processor (220) within a processing device (e.g., 210) of a robotic vehicle (e.g., 200) to detect objects (e.g., 120) and perform an action in response.

In block 310, the robotic vehicle may be operating in a normal mode in which the processor is providing control signals to control one or more motors of the robotic vehicle to execute user commands (e.g., a user controlled operation) or a preloaded flight plan. In such a normal mode, the collision avoidance system may be operating using a default proximity threshold to determine when evasive maneuvers should be implemented when approaching objects.

In block 320, the processor may obtain data from one or more sensors that are configured to detect the presence of one or more objects in the vicinity of the robotic vehicle. Examples of such sensors include cameras, radar, lidar, and the like. Such sensors may include ranging sensors, such as radar, sonar, and lidar, which may be used to detect the presence in range to an object. Such sensors may also include imaging sensors, such as a camera or a set of cameras, that may be used to classify objects (e.g., in block 330). For ease of illustration, references are made to processing camera image data in describing operations of various embodiments. However, such operations may be equally applicable to ranging sensor(s) data processing. In some implementations, the processor may detect objects in the vicinity of the robotic vehicle based on ranging sensors, such as radar, sonar and/or lidar returns. In some implementations, the processor may receive image data from multiple cameras, which may enable the processor to determine distances to objects (e.g., through stereoscopy) as well as observe objects over a wide angle. Such sensor data may be stored in local memory, such as a buffer, to support data processing in subsequent operations.

In determination block 325, the processor may determine whether there are any objects present in the vicinity of the robotic vehicle. For example, the processor may determine whether any detected objects are within a predefined distance of the robotic vehicle.

In response to determining that no nearby objects are present (i.e., determination block 325="No"), the processor may continue to operate normally in block 310 controlling motors to execute user commands or the pre-loaded flight plan. Thus, the collision avoidance system may continue using a default proximity threshold. In some circumstances, the processor may return the proximity threshold to the default value in optional block 360 if not already at the default level.

In response to determining that one or more obstacles are present (i.e., determination block 325="Yes"), the processor (or another processor configured to perform such analysis) may analyze the data obtained from the one or more sensors to recognize and classify objects that are in the vicinity of the robotic vehicle in block 330. In some embodiments, the processor may use image recognition methods to distinguish objects within images and analyze the shapes of the objects to recognize or classify the objects. For example, the processor may compare image data to object recognition models to determine whether objects can be recognized as particular objects (e.g., the user based on facial recognition) or classified as certain types of objects (e.g., people, animals, trees, cars, buildings, etc.). As another example, using camera image data, the processor may perform image processing analysis to detect edges, masses and other features characteristic of objects within the field of view. In some embodiments, radar, sonar and/or lidar data may be used to detect and locate nearby objects, with that information then leveraged in image processing to characterize the detected objects.

As a further operation in block 330, the processor may analyze detected objects to determine an appropriate classification for each object. For example, the processor may perform image recognition algorithms on image data to determine whether an object is recognized as a particular type. Such image recognition processes may compare images of a particular object to databases of classified or classifiable objects to determine whether there is a likelihood of a match. Such image recognition processes may use machine learning to develop models for use in assigning classifications to objects.

In some embodiments, the processor may categorize objects in terms of a few broad classifications in block 330, such as whether the objects are animate or inanimate, or whether the type of object is known to be fragile or not, etc. In some embodiments, the processor may determine specific categories of objects in block 330, such as recognizing and classifying objects as adults, children, dogs, cats, trees, etc. In some embodiments, the processor may determine specific identities of objects in block 330, such as recognizing particular individuals (e.g., using facial recognition) or particular animals (e.g., the family dog) for which the processor may be trained (e.g., through an initial training routine) and for which particular (e.g., user-assigned) proximity threshold values may be specified. The more specific the classification made in block 330, the more different proximity thresholds may be assigned to various objects by the processor.

As part of classifying objects in block 330, the processor may determine that some objects cannot be classified, in which case the determined classification may be unknown or a default classification. In some embodiments, the operations of classifying objects in block 330 may be performed for all detected objects in the vicinity of the robotic vehicle. In some embodiments only the closest or closest few objects may be classified in block 330.

In determination block 340, the processor may determine whether the proximity threshold for any of the identified obstacles should be changed based upon the classification of the object determined in block 330. Thus, the processor may determine whether any objects classified in block 330 have a classification associated with or for which an adjustment in the proximity threshold is appropriate. For example, the processor may evaluate the object classifications to determine whether one or more of the identified potential objects is classified as animate vs. inanimate, fragile or valuable, human, animal, etc. In some embodiments or circumstances, the processor may evaluate only those objects that the robotic vehicle is approaching or are approaching the robotic vehicle, ignoring objects that the vehicle is traveling away from (i.e., the separation distance is increasing).

In response to determining that one or more detected objects has a classification for which changing the priority threshold is appropriate (i.e., determination block 340="Yes"), the processor may adjust the proximity threshold used for collision avoidance to a distance corresponding to that object's classification in block 350. In some embodiments, the processor may adjust the proximity threshold used for collision avoidance based on the nearest object's classification in block 350. In some embodiments, the processor may adjust the proximity threshold used for collision avoidance based on the largest proximity threshold corresponding to any of the objects within the vicinity of the robotic vehicle in block 350. In some embodiments, the processor may adjust the proximity threshold used for collision avoidance based on the largest proximity threshold corresponding to any of the objects within predefined distance of the robotic vehicle in block 350. For example, if the processor has determined that an obstacle or potential obstacle is a human, the processor may increase the proximity threshold used by the collision avoidance system to a distance appropriate to ensure that the human is not injured by an inadvertent collision with the robotic vehicle. The amount by which the proximity threshold is adjusted (or the proximity threshold used) may be different for different types of classifications. For example, the proximity threshold used for objects classified as animals may be smaller than the proximity threshold used for objects classified as humans. The default proximity threshold may be used for objects (i.e., no change to the priority threshold) for which a classification is not determined.

In either of determination block 340 or block 350, the processor may access a data table or other data structure in memory that correlates proximity threshold values with object/obstacle classifications. In various embodiments, the proximity threshold values and object classifications included in such a data table or data structure may be pre-defined (e.g., by a manufacturer), uploaded to memory from a data source (e.g., during a registration or software update process), user defined (e.g., during a user configuration procedure), and the like. In some embodiments, the proximity threshold values and object classifications included in such a data table or data structure may be populated through a machine learning procedure in which the processor observes a user's operating behavior and images objects over time and populates the data table with correlations of observed closest distances to objects with recognizable characteristics of those objects.

In response to determining that none of the detected objects have a threshold proximity threshold different from the default threshold (i.e., determination block 340="No"), the processor may return the proximity threshold to the default value in optional block 360 if not already at the default level. In some embodiments, a default proximity threshold may be used for objects (i.e., no change to the priority threshold) for which a classification is not determined.

In block 370 the processor may control the motor or motors of the robotic vehicle to maneuver in a manner that will avoid the detected object or objects by at least the new proximity threshold. In some embodiments, the robotic vehicle may continue to operate normally executing user commands and/or a preloaded flight plan relying on the collision avoidance system to prevent approaching objects closer than the current setting of the proximity threshold. In some embodiments, the processor may modify control of the robotic vehicle, such as to adjust or modify preloaded flight plan to ensure that the robotic vehicle does not approach a detected object closer than the current setting of the proximity threshold.

The processor may continue to obtain sensor data, analyze the sensor data to whether any objects are in the vicinity of the robotic vehicle in blocks 320-325 as described. If no more objects are present in the vicinity of the robotic vehicle (i.e., determination block 325="No"), the processor may return the proximity threshold to the default level in optional block 360 and continue executing user commands and/or a preloaded flight plan in block 310. Whenever potential obstacles are detected (i.e., determination block 325="Yes"), the processor may determine whether proximity threshold changes are required, make such adjustments, and control the robotic vehicle with the collision avoidance system set with the adjusted proximity thresholds in blocks 330-370 as described.

Figure 3B:
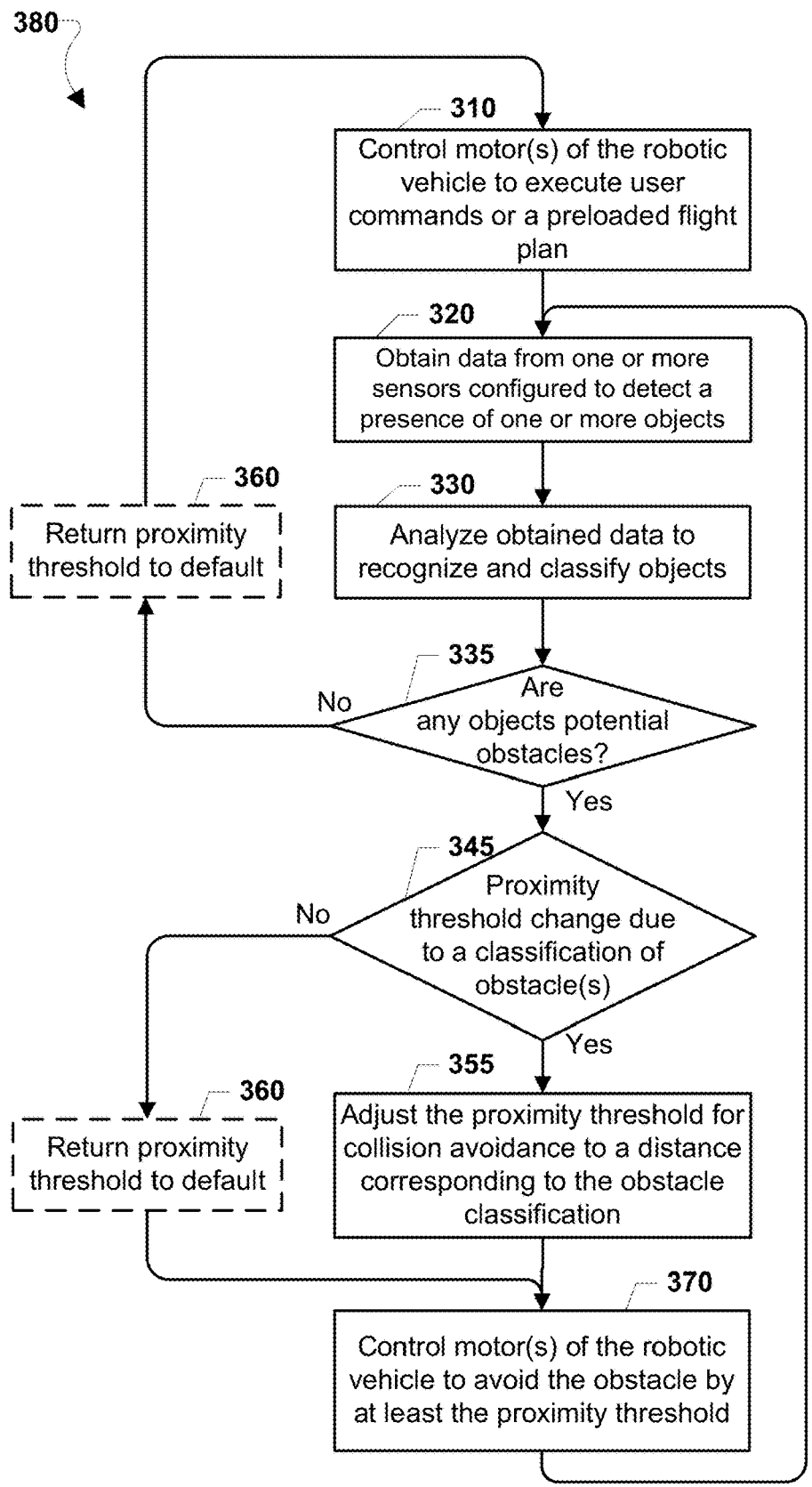
FIG. 3B is a process flow diagram illustrating a method for operating a robotic vehicle to avoid obstacles by at least a proximity threshold that depends upon a classification of each obstacle in accordance with various embodiments.

Not all objects that may be within the vicinity of the robotic vehicle may pose obstacles to vehicle operations. In some embodiments, the processing involved in classifying objects may be performed just on those objects that pose a potential obstacle to the robotic vehicle. FIG. 3B illustrates a method 300 for adjusting the proximity threshold used by a collision avoidance system of a robotic vehicle to avoid objects determined to be obstacles or potential obstacles according to some embodiments. With reference to FIGS. 1A-3B, the method 380 may be performed by a processor, such as a processor (220) within a processing device (e.g., 210) of a robotic vehicle (e.g., 200) to detect obstacles (e.g., 120) and perform an action in response. In the method 380, the processor may perform operations of like numbered blocks of the method 300 as described.

In block 310, the robotic vehicle may be operating in a normal mode in which the processor is providing control signals to control one or more motors of the robotic vehicle to execute user commands (e.g., a user controlled operation) or a preloaded flight plan. In such a normal mode, the collision avoidance system may be operating using a default proximity threshold to determine when evasive maneuvers should be implemented when approaching obstacles.

In block 320, the processor may obtain data from one or more sensors that are configured to detect the presence of one or more objects in the vicinity of the robotic vehicle. Such sensors may be detection and ranging sensors, such as radar, sonar, and/or lidar, which both detect and determine the location of objects. Such sensors may also include imaging sensors, such as cameras, coupled with image processing hardware configured to recognize objects within image data. For ease of illustration, references are made to processing camera image data in describing operations of various embodiments. However, such operations may be equally applicable to radar, sonar and/or lidar data processing. In some implementations, the processor may detect objects in the vicinity of the robotic vehicle based on radar and/or lidar returns. In some implementations, the processor may receive image data from multiple cameras, which may enable the processor to determine distances to objects (e.g., through stereoscopy) as well as observe objects over a wide angle. Such sensor data may be stored in local memory, such as a buffer, to support data processing in subsequent operations.

In block 330, the processor (or another processor configured to perform such analysis) may analyze the data obtained from the one or more sensors to recognize and classify objects that are in the vicinity of the robotic vehicle. In some embodiments, the processor may use image recognition methods to distinguish objects within images and analyze the shapes of the objects to recognize or classify the objects. For example, the processor may compare image data to object recognition models to determine whether objects can be recognized as particular objects (e.g., the user based on facial recognition) or classified as certain types of objects (e.g., people, animals, trees, cars, buildings, etc.). As another example, using camera image data, the processor may perform image processing analysis to detect edges, masses and other features characteristic of objects within the field of view. In some embodiments, radar and/or lidar data may be used to detect and locate nearby objects, with that information then leveraged in image processing to characterize the detected objects.

As a further operation in block 330, the processor may analyze detected objects to determine an appropriate classification for each object as described.

In some embodiments, the processor may categorize objects in terms of a few broad classifications in block 330, such as whether the objects are animate or inanimate, or whether the type of object is known to be fragile or not, etc. In some embodiments, the processor may determine specific categories of objects in block 330, such as recognizing and classifying objects as adults, children, dogs, cats, trees, etc. In some embodiments, the processor may determine specific identities of objects in block 330, such as recognizing particular individuals (e.g., using facial recognition) or particular animals (e.g., the family dog) for which the processor may be trained (e.g., through an initial training routine) and for which particular (e.g., user-assigned) proximity threshold values may be specified. The more specific the classification made in block 330, the more different proximity thresholds may be assigned to various objects by the processor.

As part of classifying objects in block 330, the processor may determine that some objects cannot be classified, in which case the determined classification may be unknown or a default classification. In some embodiments, the operations of classifying objects in block 330 may be performed for all detected objects in the vicinity of the robotic vehicle. In some embodiments only the closest or closest few objects may be classified in block 330.

In determination block 335, the processor may determine whether there are any objects present in the vicinity of the robotic vehicle that would or could be obstacles to movement. For example, if the robotic vehicle is executing a preloaded flight plan, the processor may determine whether any detected objects identified in block 330 are close to or could interfere with the flight plan. As another example, if the robotic vehicle is under user control, and thus is likely to move in any direction, the processor may identify any object within a predetermined distance to be a potential obstacle. The operations in determination block 335 may not be performed in some embodiments, in which case all nearby objects, or objects detected within a threshold distance, may be treated as obstacles or potential obstacles for purposes of assigning corresponding proximity thresholds.

In response to determining that no nearby objects are present (i.e., determination block 335="No"), the processor may continue to operate normally in block 310 controlling motors to execute user commands or the pre-loaded flight plan. Thus, the collision avoidance system may continue using a default proximity threshold. In some circumstances, the processor may return the proximity threshold to the default value in optional block 360 if not already at the default level.

In response to determining that one or more obstacles are present (i.e., determination block 335="Yes"), the processor may determine whether the proximity threshold for any of the identified obstacles should be changed based upon the classification of the object determined in block 330. Thus, the processor may determine whether any objects classified in block 330 that were determined to be obstacles or potential obstacles in determination block 335 have a classification associated with or for which an adjustment in the proximity threshold is appropriate. For example, the processor may evaluate the object classifications to determine whether one or more of the identified potential obstacles is classified as animate vs. inanimate, fragile or valuable, human, animal, etc.

In response to determining that one or more detected obstacles has a classification for which changing the priority threshold is appropriate (i.e., determination block 345="Yes"), the processor may adjust the proximity threshold used for collision avoidance to a distance corresponding to that object's classification in block 355. In some embodiments, the processor may adjust the proximity threshold used for collision avoidance based on the nearest obstacle's classification in block 355. In some embodiments, the processor may adjust the proximity threshold used for collision avoidance based on the largest proximity threshold corresponding to any of the obstacles to the robotic vehicle in block 355. In some embodiments, the processor may adjust the proximity threshold used for collision avoidance based on the largest proximity threshold corresponding to any of the obstacles within a predefined distance of the robotic vehicle in block 355. For example, if the processor has determined that an obstacle or potential obstacle is a human, the processor may increase the proximity threshold used by the collision avoidance system to a distance appropriate to ensure that the human is not injured by an inadvertent collision with the robotic vehicle. The amount by which the proximity threshold is adjusted (or the proximity threshold used) may be different for different types of classifications. For example, the proximity threshold used for objects classified as animals may be smaller than the proximity threshold used for objects classified as humans. The default proximity threshold may be used for objects (i.e., no change to the priority threshold) for which a classification is not determined.

In either of determination block 345 or block 355, the processor may access a data table or other data structure in memory that correlates proximity threshold values with object/obstacle classifications. In various embodiments, the proximity threshold values and object/obstacle classifications included in such a data table or data structure may be pre-defined (e.g., by a manufacturer), uploaded to memory from a data source (e.g., during a registration or software update process), user defined (e.g., during a user configuration procedure), and the like. In some embodiments, the proximity threshold values and object/obstacle classifications included in such a data table or data structure may be populated through a machine learning procedure in which the processor observes a user's operating behavior and images objects over time and populates the data table with correlations of observed closest distances to objects with recognizable characteristics of those objects.

In response to determining that none of the detected obstacles have a threshold proximity threshold different from the default threshold (i.e., determination block 345="No"), the processor may return the proximity threshold to the default value in optional block 360 if not already at the default level. In some embodiments, a default proximity threshold may be used for objects (i.e., no change to the priority threshold) for which a classification is not determined.

In block 370 the processor may control the motor or motors of the robotic vehicle to maneuver in a manner that will avoid the detected obstacle or obstacles by at least the new proximity threshold. In some embodiments, the robotic vehicle may continue to operate normally executing user commands and/or a preloaded flight plan relying on the collision avoidance system to prevent approaching the object closer than the current setting of the proximity threshold. In some embodiments, the processor may modify control of the robotic vehicle, such as to adjust or modify preloaded flight plan to ensure that the robotic vehicle does not approach a detected obstacle closer than the current setting of the proximity threshold.

The processor may continue to obtain sensor data, analyze the data to recognize and classify objects, and determine whether any objects are or could be obstacles in blocks 320-335 as described. If no more obstacles are determined to be present (i.e., determination block 335="No"), the processor may return the proximity threshold to the default level and continue executing user commands and/or a preloaded flight plan in block 310. Whenever potential obstacles are detected (i.e., determination block 335="Yes"), the processor may determine whether proximity threshold changes are required, make such adjustments, and control the robotic vehicle with the collision avoidance system set with the adjusted proximity thresholds in blocks 345-370 as described.

Figure 4:
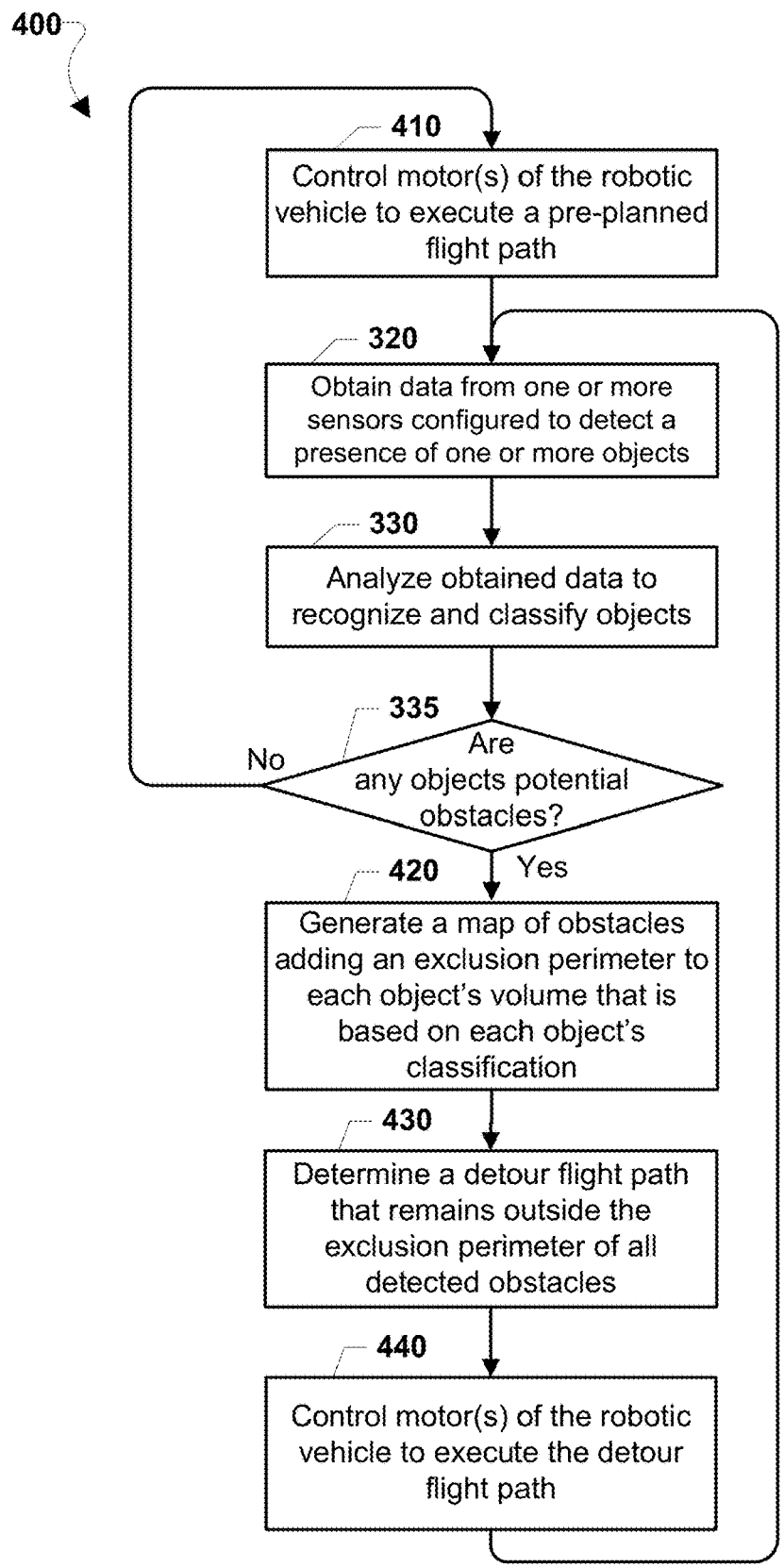
FIG. 4 is a process flow diagram illustrating method for operating a robotic vehicle including path planning to avoid each obstacle by at least an exclusion perimeter that depends upon a classification of the obstacle in accordance with various embodiments.

FIG. 4 illustrates a method 400 for operating a robotic vehicle according to some embodiments. With reference to FIGS. 1A-4, the method 400 may be performed by a processor, such as a processor (220) within a processing device (e.g., 210) of a robotic vehicle (e.g., 200) to detect obstacles (e.g., 120) and perform an action in response.

In some embodiments, the processor of the robotic vehicle may use object classifications to adjust proximity thresholds for a variety of detected objects while performing path planning around such objects. By evaluating each of the appropriate proximity thresholds for each detected object within the vicinity of the robotic vehicle, the processor may develop a detour or path plan alternative that enables the robotic vehicle maneuver around the objects in a manner that avoids approaching any objects closer than its corresponding proximity threshold. By performing such path planning, the robotic vehicle may follow an efficient path around or through detected objects compared to using the collision avoidance system to avoid colliding with individual obstacles, which could result in the robotic vehicle having to backtrack or follow a random path through a plurality of obstacles. Various methods for accomplishing such path planning are possible. The method 400 illustrated in FIG. 4 provides an example of one method that may be implemented for this purpose.

In block 410, the processor of the robotic vehicle may be controlling one or more motors of the robotic vehicle to execute a preplanned of flight. In block 320, the processor may obtain data from one or more sensors that are configured to detect the presence of objects in the vicinity of the vehicle. As described, such sensors may include one or more cameras, radar, sonar, lidar, etc. Data from such sensors may be stored in memory, such as buffer memory, to enable analysis by the processor.

In block 330, the processor may analyze the obtained sensor data to recognize and classify the objects in the vicinity of the vehicle. Such analyses may implement one or more of the operations of the like numbered block of the method 300 as described.

In determination block 335, the processor may determine whether any of the identified and classified objects present obstacles or potential obstacles to the robotic vehicle. In particular, the processor may determine whether any of the objects identified in block 330 are close to the preplanned path.

In response to determining that no obstacles or potential obstacles are present in the vicinity of the robotic vehicle (i.e., determination block 335="No"), the processor may continue to control one or more motors of the robotic vehicle to execute the preplanned path in block 410.

In response to determining that one or more classified objects do or could present obstacles to the robotic vehicle (i.e., determination block 335="Yes"), the processor may generate a virtual map of the objects that adds in an exclusion perimeter around each object's volume that is based upon that object's classification in block 420. Thus, instead of adjusting the proximity threshold used in the collision avoidance system for individual objects, the processor may use the corresponding proximity threshold to extend the boundary of an object as represented in the virtual map generated in block 420. A default proximity threshold may be used for adding an exclusion perimeter around objects (i.e., no change to the priority threshold) for which a classification is not determined.

In block 430, the processor may use the map generated in block 420 to determine a detour path around or through the identified obstacles that ensures the robotic vehicle remains outside of the respective proximity threshold for all obstacles. The processor may accomplish such path planning using any of a variety of path planning algorithms. Using the object classification-specific proximity thresholds to add exclusion perimeters around objects in block 420 facilitates planning a path that maneuvers around objects by at least their respective proximity thresholds.

In block 440, the processor may control one or more motors of the robotic vehicle to execute the detour path. Doing so, the processor may continue to obtain data from various sensors in block 320 and analyze the sensor data to recognizing classify nearby objects in block 330 as described. Once the robotic vehicle has cleared the obstacles, such as by completing the detour path (i.e., determination block 335="No"), the processor may return to controlling the one or more motors of the robotic vehicle to execute the preplanned path in block 410, and repeat the operations of the method 400 as described.

Figure 5:
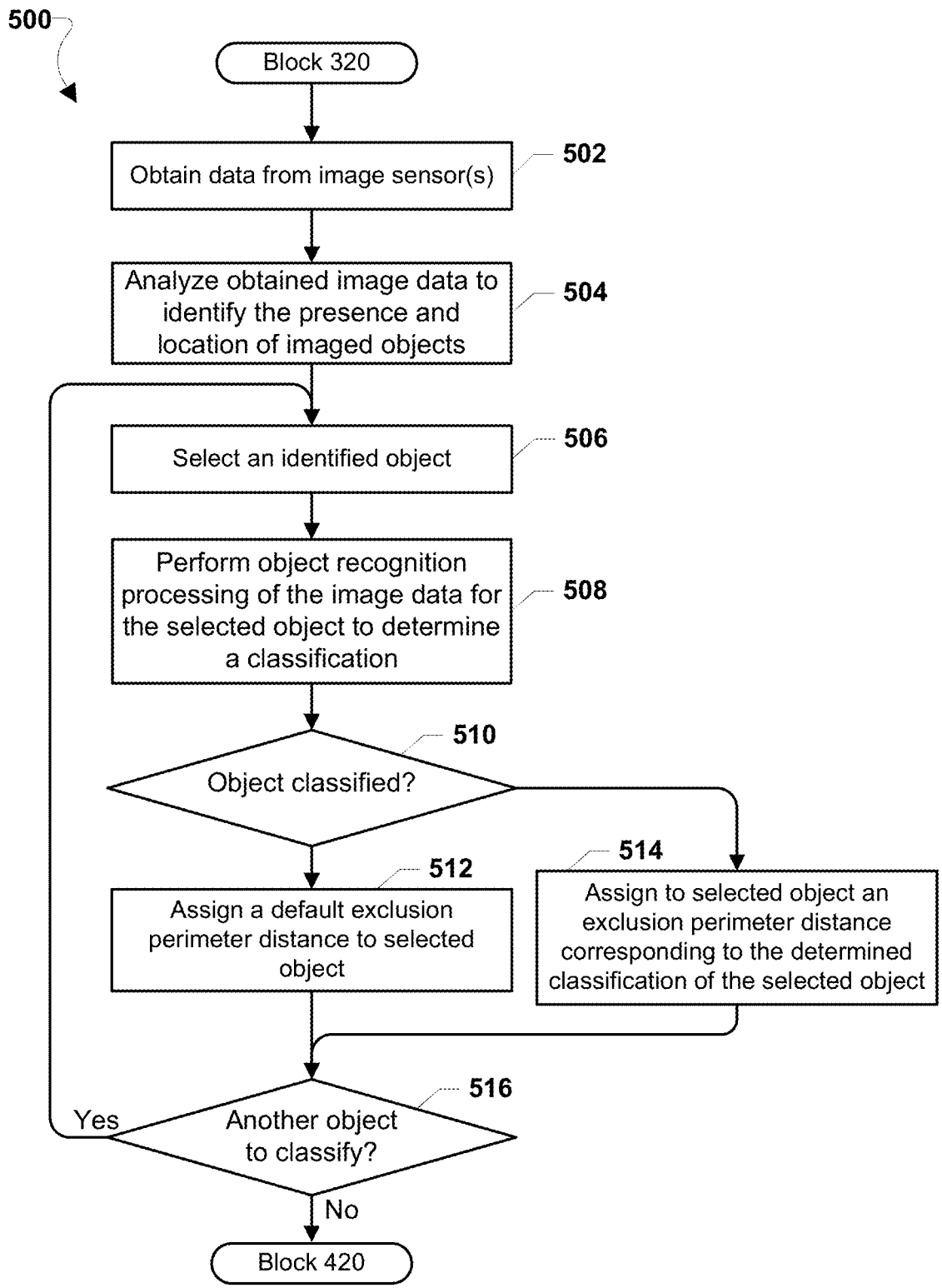
FIG. 5 is a process flow diagram illustrating a method of classifying objects and assigning exclusion perimeter distances to the objects based upon each object's classification in accordance with various embodiments.

FIG. 5 illustrates a method 500 for detecting and classifying objects for use in the method 400 according to some embodiments. With reference to FIGS. 1A-5, the method 500 may be performed by a processor, such as a processor (220) within a processing device (e.g., 210) of a robotic vehicle (e.g., 200) to detect obstacles (e.g., 120) and perform an action in response.

In block 502, the processor may obtain data from image sensors, such as one or more cameras positioned on the robotic vehicle. The processor may also obtain other sensor data, such as radar or lidar data, that is useful for determining the relative location of objects. Such data may be stored in local memory for processing, such as buffer memory.

In block 504, the processor may analyze the obtained image and other data to identify the presence and location of the imaged objects. Such image analysis may involve identifying edges zones of different colors and other types of processes that are typically used to identify objects within images. In some embodiments, the robotic vehicle may be equipped with stereoscopic cameras which may enable the processor to determine the distance to various objects using stereoscopy. In embodiments in which the robotic vehicle is equipped with only a monocular camera, distances to various objects may be determined based on the shift in position of objects from one frame to the next as the robotic vehicle moves to the environment. In embodiments in which the robotic vehicle is equipped with radar and/or lidar, the distances to objects may be determined using data from those sensors. In determining the location of objects, the processor may generate a file or database of object coordinates in memory that enables the processor to generate a map of objects in subsequent operations.

Each of the objects that are identified in block 504 may be individually analyzed using image recognition processes. To do so, the processor may implement a loop to individually investigate each object. Thus, in block 506, the processor may select one of the identified objects, and perform object recognition processing on of the image data for the selected object to determine the classification in block 508. As described, such image recognition processing may involve comparing image data to the database of classified objects to determine whether there is a close match. Such image recognition processes may involve the use of machine learning techniques.

In determination block 510, the processor may determine whether a classification is assigned to the selected object.

In response to determining that no classification is assigned to the selected object (i.e., determination block 510="No"), the processor may assign a default exclusion perimeter distance to the selected object in block 512.

In response to determining that a classification is assigned to the selected object (i.e., determination block 510="Yes"), the processor may assign to the selected object in exclusion perimeter distance corresponding to the classification of the selected object in block 514.

In determination block 516, the processor may determine whether there is another object within the image data to be classified. If so (i.e., determination block 516="Yes"), the processor may select another identified object in block 506 and repeat the operations of blocks 508-514 as described. When all objects have been classified (i.e., determination block 516="No"), the processor may proceed to generate a map of objects adding the exclusion perimeter based on each objects classification in block 420 of the method 400 as described.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any example embodiment. For example, one or more of the operations of the methods 300, 400 and/or 500 may be substituted for or combined with another.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with various embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for operating a robotic vehicle, comprising:
processing, by a processor of the robotic vehicle, sensor data from one or more sensors to detect an object in a vicinity of the robotic vehicle;
determining, by the processor based on the sensor data, a classification of the object in the vicinity of the robotic vehicle wherein the classification of the object comprises whether the object is an animate object of an inanimate object;
adjusting, by the processor, a proximity threshold in a collision avoidance system based on the classification of the object in the vicinity of the robotic vehicle, wherein adjusting the proximity threshold comprises one of both of increasing the proximity threshold in response to the classification of the object being animate of decreasing the proximity threshold in response to the classification of the object being inanimate;
determining, by the processor, a detour path based on the adjusted proximity threshold, wherein the detour path remains outside the adjusted proximity threshold; and
controlling, by the processor, the robotic vehicle to travel the detour path to remain outside the adjusted proximity threshold for collision avoidance.

2. The method of claim 1, further comprising determining, by the processor based on the sensor data, whether the object in the vicinity of the robotic vehicle poses an obstacle to the robotic vehicle,
wherein determining a classification of an object in the vicinity of the robotic vehicle comprises determining, by the processor, the classification of the object in response to determining that the object poses an obstacle to the robotic vehicle, and
wherein adjusting the proximity threshold setting in the collision avoidance system based on the classification of the object comprises adjusting, by the processor, the proximity threshold setting in the collision avoidance system based on the classification of the object determined to pose an obstacle to the robotic vehicle.

3. The method of claim 1, wherein adjusting the proximity threshold based on the classification of the object in the vicinity of the robotic vehicle comprises changing the proximity threshold from a default proximity threshold to a proximity threshold corresponding to the classification of the object.

4. The method of claim 1, wherein adjusting the proximity threshold setting in the collision avoidance system based on the classification of the object comprises determining the proximity threshold corresponding to the determined classification of the object.

5. The method of claim 4, wherein determining the proximity threshold corresponding to the determined classification of the object comprises accessing a data structure in memory for the proximity threshold correlated to the classification of the object.

6. The method of claim 1, further comprising returning the proximity threshold setting in the collision avoidance system to a default setting in response to determining that there are no objects in the vicinity of the robotic vehicle.

7. The method of claim 1, wherein:
determining a classification of the object in the vicinity of the robotic vehicle comprises determining a classification for objects in the vicinity of the robotic vehicle posing an obstacle to the robotic vehicle;
adjusting a proximity threshold setting in the collision avoidance system based on the classification of the object in the vicinity of the robotic vehicle comprises
generating a map of all objects posing an obstacle to the robotic vehicle in which a proximity threshold corresponding to each object based on the object's classification is added as an exclusion perimeter around a volume of the object; and
controlling the robotic vehicle using the adjusted proximity threshold for collision avoidance comprises:
determining, by the processor, a detour path that remains outside the exclusion perimeter of all detected obstacles; and
controlling, by the processor, the robotic vehicle to execute the detour path.

8. The method of claim 7, wherein a default proximity threshold is used to add an exclusion perimeter around any object in the vicinity of the robotic vehicle for which a classification is not determined.

9. A robotic vehicle, comprising:
one or more sensors configured to detect an object in a vicinity of the robotic vehicle; and
a processor coupled to the one or more sensors and configured with processor-executable instructions to:
process sensor data from the one or more sensors to detect an object in the vicinity of the robotic vehicle;
determine a classification of the object in the vicinity of the robotic vehicle, wherein the classification of the object comprises whether the object is an animate object or an inanimate object;
adjust a proximity threshold in a collision avoidance system based on the classification of the object in the vicinity of the robotic vehicle, wherein to adjust the proximity threshold, the processor is configured to one or both of increase the proximity threshold in response to the classification of the object being animate or decrease the proximity threshold in response to the classification of the object being inanimate;
determine a detour path based on the adjusted proximity threshold, wherein the detour path remains outside the adjusted proximity threshold; and
control the robotic vehicle to travel the detour path to remain outside the adjusted proximity threshold for collision avoidance.

10. The robotic vehicle of claim 9, wherein the processor is further configured to:
determine, based on the sensor data, whether the object in the vicinity of the robotic vehicle poses an obstacle to the robotic vehicle,
determine the classification of an object in the vicinity of the robotic vehicle comprises in response to determining that the object poses an obstacle to the robotic vehicle; and
adjust the proximity threshold setting in the collision avoidance system based on the classification of the object determined to pose an obstacle to the robotic vehicle.

11. The robotic vehicle of claim 9, wherein the processor is further configured to adjust the proximity threshold based on the classification of the object in the vicinity of the robotic vehicle by changing the proximity threshold from a default proximity threshold to a proximity threshold corresponding to the classification of the object.

12. The robotic vehicle of claim 9, wherein the processor is further configured to adjust the proximity threshold setting in the collision avoidance system based on the classification of the object by determining the proximity threshold corresponding to the determined classification of the object.

13. The robotic vehicle of claim 12, wherein the processor is further configured to determine the proximity threshold corresponding to the determined classification of the object by accessing a data structure in memory for the proximity threshold correlated to the classification of the object.

14. The robotic vehicle of claim 9, wherein the processor is further configured to return the proximity threshold setting in the collision avoidance system to a default setting in response to determining that there are no objects in the vicinity of the robotic vehicle.

15. The robotic vehicle of claim 10, wherein the processor is further configured to:
   determine a classification for objects in the vicinity of the robotic vehicle posing an obstacle to the robotic vehicle;
   generate a map of all objects posing an obstacle to the robotic vehicle in which a proximity threshold corresponding to each object based on the object's classification is added as an exclusion perimeter around a volume of the object; and
   determine a detour path that remains outside the exclusion perimeter of all detected obstacles; and
   control the robotic vehicle to execute the detour path.

16. The robotic vehicle of claim 15, wherein the processor is further configured to use a default proximity threshold to add an exclusion perimeter around any object in the vicinity of the robotic vehicle for which a classification is not determined.

17. A processing device configured for use in a robotic vehicle having one or more sensors configured to detect an object in a vicinity of the robotic vehicle, the processing device comprising:
   a processor; and
   a memory coupled to the processor, wherein the memory may store processor-executable instructions configured to cause the processor to:
      process sensor data from the one or more sensors to detect an object in the vicinity of the robotic vehicle;
      determine a classification of the object in the vicinity of the robotic vehicle, wherein the classification of the object comprises whether the object is an animate object or an inanimate object;
      adjust a proximity threshold in a collision avoidance system based on the classification of the object in the vicinity of the robotic vehicle, wherein to adjust the proximity threshold, the processor is configured to one or both of increase the proximity threshold in response to the classification of the object being animate or decrease the proximity threshold in response to the classification of the object being inanimate;
      determine a detour path based on the adjusted proximity threshold, wherein the detour path remains outside the adjusted proximity threshold; and
      control the robotic vehicle to travel the detour path to remain outside the adjusted proximity threshold for collision avoidance.

18. The processing device of claim 17, wherein the processor-executable instructions are further configured to cause the processor to:
   determine, based on the sensor data, whether the object in the vicinity of the robotic vehicle poses an obstacle to the robotic vehicle,
   determine the classification of an object in the vicinity of the robotic vehicle comprises in response to determining that the object poses an obstacle to the robotic vehicle; and
   adjust the proximity threshold setting in the collision avoidance system based on the classification of the object determined to pose an obstacle to the robotic vehicle.

19. The processing device of claim 17, wherein the processor-executable instructions are further configured to cause the processor to adjust the proximity threshold based on the classification of the object in the vicinity of the robotic vehicle by changing the proximity threshold from a default proximity threshold to a proximity threshold corresponding to the classification of the object.

20. The processing device of claim 17, wherein the processor-executable instructions are further configured to cause the processor to adjust the proximity threshold setting in the collision avoidance system based on the classification of the object by determining the proximity threshold corresponding to the determined classification of the object.

21. The processing device of claim 20, wherein the processor-executable instructions are further configured to cause the processor to determine the proximity threshold corresponding to the determined classification of the object by accessing a data structure in memory for the proximity threshold correlated to the classification of the object.

22. The processing device of claim 17, wherein the processor-executable instructions are further configured to cause the processor to return the proximity threshold setting in the collision avoidance system to a default setting in response to determining that there are no objects in the vicinity of the robotic vehicle.

23. The processing device of claim 17, wherein the processor-executable instructions are further configured to cause the processor to:
   determine a classification for objects in the vicinity of the robotic vehicle posing an obstacle to the robotic vehicle;
   generate a map of all objects posing an obstacle to the robotic vehicle in which a proximity threshold corresponding to each object based on the object's classification is added as an exclusion perimeter around a volume of the object; and
   determine a detour path that remains outside the exclusion perimeter of all detected obstacles; and
   control the robotic vehicle to execute the detour path.

24. The processing device of claim 23, wherein the processor-executable instructions are further configured to cause the processor to use a default proximity threshold to add an exclusion perimeter around any object in the vicinity of the robotic vehicle for which a classification is not determined.

25. A non-transitory processor readable storage medium having stored thereon processor-executable instructions configured to cause a processor of a robotic vehicle to perform operations comprising:
   processing sensor data from one or more sensors to detect an object in a vicinity of the robotic vehicle, wherein the classification of the object comprises whether the object is an animate object or an inanimate object;
   determining, based on the sensor data, a classification of the object in the vicinity of the robotic vehicle;
   adjusting a proximity threshold in a collision avoidance system based on the classification of the object in the vicinity of the robotic vehicle, where adjusting the proximity threshold comprises one or both of increasing the proximity threshold in response to the classification of the object being animate or decreasing the proximity threshold in response to the classification of the object being inanimate;

determining a detour path based on the adjusted proximity threshold, wherein the detour path remains outside the adjusted proximity threshold; and controlling the robotic vehicle to travel the detour path to remain outside the adjusted proximity threshold for collision avoidance.

26. The non-transitory processor readable storage medium of claim 25, wherein the stored processor-executable instructions are configured to cause the processor of the robotic vehicle to perform operations further comprising determining whether the object in the vicinity of the robotic vehicle poses an obstacle to the robotic vehicle, and wherein the stored processor-executable instructions are configured to cause the processor of the robotic vehicle to perform operations such that:

determining a classification of an object in the vicinity of the robotic vehicle comprises determining the classification of the object in response to determining that the object poses an obstacle to the robotic vehicle; and adjusting the proximity threshold setting in the collision avoidance system based on the classification of the object comprises adjusting the proximity threshold setting in the collision avoidance system based on the classification of one or more objects determined to pose an obstacle to the robotic vehicle.

27. The non-transitory processor readable storage medium of claim 25, wherein the stored processor-executable instructions are configured to cause the processor of the robotic vehicle to perform operations such that:

determining a classification of the object in the vicinity of the robotic vehicle comprises determining a classification for all objects in the vicinity of the robotic vehicle posing an obstacle to the robotic vehicle;

adjusting a proximity threshold setting in the collision avoidance system based on the classification of the object in the vicinity of the robotic vehicle comprises generating a map of all objects posing an obstacle to the robotic vehicle in which a proximity threshold corresponding to each object based on the object's classification is added as an exclusion perimeter around a volume of the object; and controlling the robotic vehicle using the adjusted proximity threshold for collision avoidance comprises:

determining a detour path that remains outside the exclusion perimeter of all detected obstacles; and controlling the robotic vehicle to execute the detour path.

* * * * *